(12) United States Patent
Sanderson et al.

(10) Patent No.: US 9,774,046 B2
(45) Date of Patent: Sep. 26, 2017

(54) HUMIDIFICATION SYSTEM AND METHOD FOR A FUEL CELL

(71) Applicant: FORD GLOBAL TECHNOLOGIES, LLC, Dearborn, MI (US)

(72) Inventors: William F. Sanderson, Commerce Township, MI (US); Mark A. Pellerin, Saline, MI (US); Craig Michael Mathie, White Lake Township, MI (US); Virgo W. Edwards, Commerce Township, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 180 days.

(21) Appl. No.: 14/801,905

(22) Filed: Jul. 17, 2015

(65) Prior Publication Data
US 2017/0018787 A1    Jan. 19, 2017

(51) Int. Cl.
*H01M 8/04*         (2016.01)
*H01M 8/04119*      (2016.01)
*H01M 8/04014*      (2016.01)

(52) U.S. Cl.
CPC ... *H01M 8/04164* (2013.01); *H01M 8/04014* (2013.01); *H01M 8/04141* (2013.01)

(58) Field of Classification Search
CPC ......... H01M 8/04014; H01M 8/04141; H01M 8/04164; H01M 8/04007; H01M 8/04029; H01M 8/04067
See application file for complete search history.

(56) References Cited

U.S. PATENT DOCUMENTS

| | | | |
|---|---|---|---|
| 3,976,506 A * | 8/1976 | Landau | F02C 6/00 429/414 |
| 6,863,268 B2 | 3/2005 | Zhang | |
| 8,216,728 B2 | 7/2012 | Konrad et al. | |
| 8,293,416 B2 | 10/2012 | Kobayashi et al. | |
| 2007/0048572 A1 | 3/2007 | Oglesby et al. | |
| 2010/0086818 A1 | 4/2010 | Konrad et al. | |
| 2011/0250514 A1 * | 10/2011 | Ramaswamy | H01M 8/04164 429/414 |
| 2014/0120436 A1 | 5/2014 | Blanchet et al. | |

* cited by examiner

*Primary Examiner* — Mark F Huff
*Assistant Examiner* — Monique Wills
(74) *Attorney, Agent, or Firm* — Damian Porcari; Brooks Kushman P.C.

(57) ABSTRACT

A humidification system for a fuel cell may include a condenser configured to receive fluid output from a cathode of the fuel cell and cool the fluid to extract water from it. A heat exchanger operable to transfer heat from a heat source to an airflow flowing through the heat exchanger may also be included. When the heated airflow is brought into contact with at least some of the extracted water, the airflow is humidified prior to its entering the cathode.

20 Claims, 4 Drawing Sheets

HUMIDIFICATION SYSTEM AND METHOD FOR A FUEL CELL

TECHNICAL FIELD

The present invention relates to a humidification system and a method of humidification for a fuel cell.

BACKGROUND

Humidifying the cathode flow stream of a fuel cell system can require components that are costly, complex, consume an undesirable amount of space, and may be prone to inefficient or intermittent operation, depending on the application where the fuel cell is being used. This may be particularly true in vehicle applications, where available space is limited, and the fuel cell may be exposed to extreme ambient temperatures. For example, lines containing liquid water in such a system are susceptible to blockage issues in freezing conditions.

SUMMARY

At least some embodiments of the present invention may include a humidification system for a fuel cell. The humidification system may include a condenser configured to receive fluid output from a cathode of the fuel cell and cool the fluid to extract water from it. It may also include a heat exchanger operable to transfer heat between a heat source and an airflow flowing through the heat exchanger, and bring the airflow in contact with at least some of the extracted water to humidify the airflow prior to the airflow entering the cathode.

At least some embodiments of the present invention may include a humidification system for a fuel cell having a condenser configured to receive fluid output from a cathode of the fuel cell and operable to extract water from the fluid. A heat exchanger may be connected to the condenser to receive at least some of the extracted water. The heat exchanger may be configured to transfer heat to an airflow prior to the airflow entering the cathode such that at least some of the extracted water is evaporated into the airflow.

At least some embodiments of the present invention may include a method for humidifying an airflow for a fuel cell. The method may include the step of introducing an airflow into a heat exchanger and transferring heat to the airflow. Fluid from a cathode of the fuel cell may be transferred to a condenser and water may be extracted from the fluid. At least some of the extracted water from the condenser may be transferred to the heat exchanger and the heated airflow humidified. The humidified airflow may then be introduced into the cathode.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
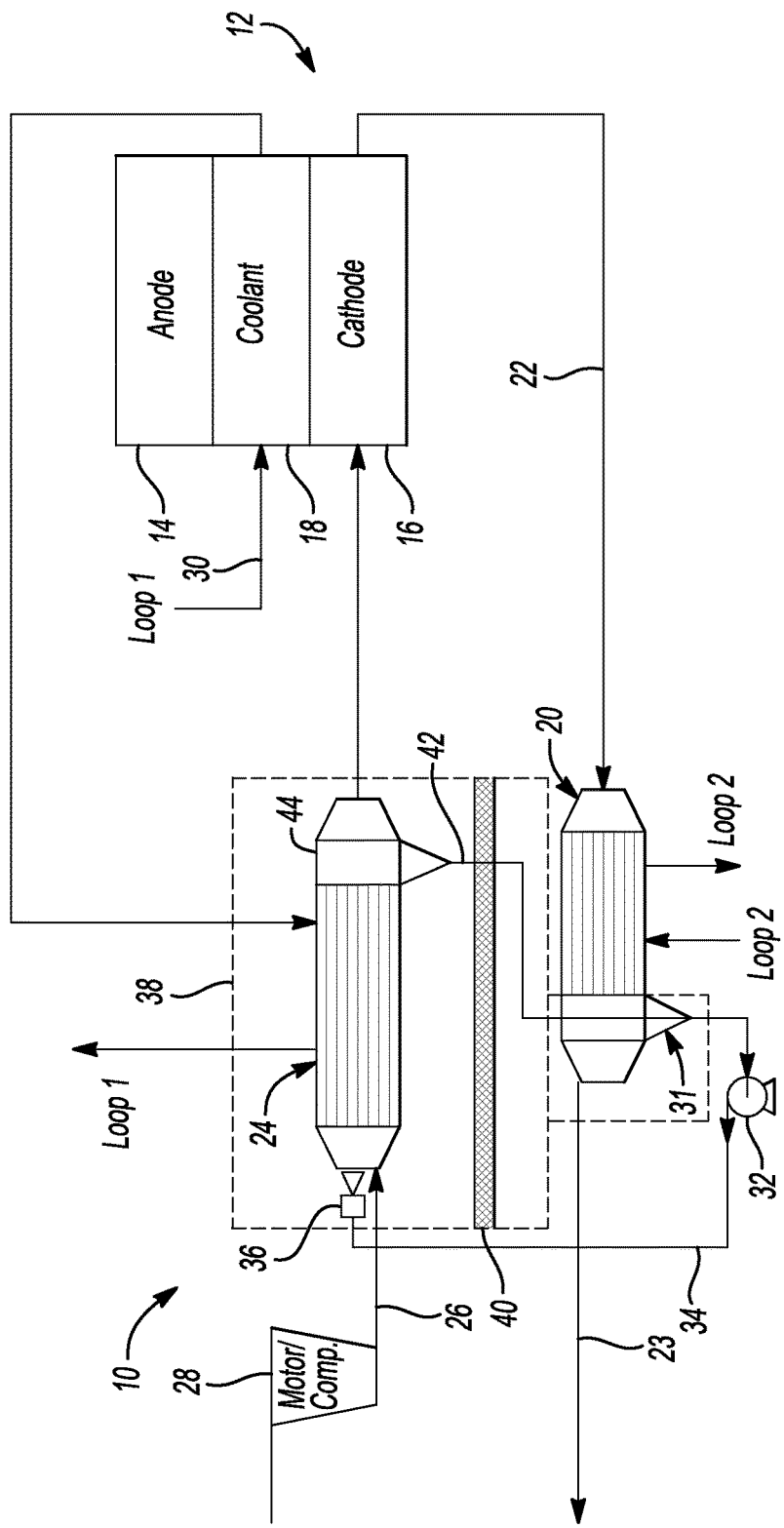
FIG. 1 shows a schematic representation of a humidification system for a fuel cell in accordance with at least some embodiments of the present invention.

FIG. 1 shows a humidification system 10 in accordance with embodiments of the present invention. The humidification system 10 is configured to work with a fuel cell 12, the components of which are illustrated schematically in FIG. 1. It is understood that a fuel cell system may include many components, and that what is referred to in FIG. 1 as the fuel cell 12, may be more particularly referred to as a "fuel cell stack", one part of a larger fuel cell system. The fuel cell 12 includes an anode 14, a cathode 16, and bipolar plates 18, which have a coolant running through them. More particularly, the anode 14, cathode 16, and bipolar plates 18 may be respectively referred to as the "anode portion of the fuel cell stack", the "cathode portion of the fuel cell stack", and the "coolant portion of the bipolar plates". These longer, more specific terms are known and understood to those in the art, but are referred to by the shorter names herein for brevity. As described in more detail below, the bipolar plates 18 receive a first coolant which flows through a first cooling loop labeled in FIG. 1 as "Loop 1".

The humidification system 10 includes a condenser 20, which is configured to receive fluid output from the cathode 16—this is illustrated by the fluid line 22. The output from the cathode 16 may include such constituent materials as water vapor, liquid water, and other gases such as nitrogen, oxygen, and trace gases from ambient air. The condenser 20 is configured to receive this fluid stream and to extract water from it, at least in part by cooling the fluid stream. The condenser 20 may also include a screen or mesh device in the flow path, a U-turn or centrifugal flow path that utilizes the momentum of the heavy liquid to separate it from the gaseous flow, or one or more baffle plates that physically obstruct a portion of the condenser airflow to facilitate the collection of the liquid water. Upon leaving the condenser 20, the non-extracted materials are disposed of through an exhaust line 23.

The humidification system 10 also includes a humidifier portion having a heat exchanger 24, which in the embodiment shown in FIG. 1 is a contact heat exchanger which exchanges heat between a liquid and gas. More specifically, the heat exchanger 24 receives an airflow 26, which may be a compressed airflow acted on by a compressor 28, and transfers heat between the airflow 26 and a heat source, which in the embodiment shown in FIG. 1 is the first coolant. The first cooling loop flows through the heat exchanger 24 where it transfers heat to the airflow 26. The first coolant flowing through Loop 1 may pick up heat from any of a number of sources.

In the embodiment shown in FIG. 1, it is contemplated that the fuel cell 12 is used to generate electricity for an electric or hybrid electric vehicle. In such a case, in addition to the fuel cell 12 itself, Loop 1 may include a radiator, an air compressor and intercooler, other vehicle components, or some combination thereof. In general, Loop 1 is a high-temperature cooling loop that picks up heat by cooling hot components such as the fuel cell 12, and it transfers heat to cooler materials such as the airflow 26. In the embodiment illustrated in FIG. 1, the temperature of the first cooling loop may range from −30 C to 95 C, though a temperature of approximately 68 C may frequently be seen at the inlet 30 of the bipolar plates 18. It is worth noting that in some embodiments and under some operating conditions, an airflow, such as the airflow 26, may be heated to such an extent by a compressor, such as the compressor 28, that it is at a higher temperature than the coolant flowing through the heat exchanger. In such a case, it is possible that heat will be transferred between the heat exchanger and the airflow in a direction opposite to that described above—i.e., the airflow will transfer heat to the first coolant in the heat exchanger.

As described above, the condenser 20 is configured to extract water from the fluid 22 leaving the cathode 16. A portion 31 of the condenser 20 may include a knockout and sump to facilitate the water collection. A pump 32 pumps the extracted water through a water line 34 connecting the condenser 20 to the heat exchanger 24. As the fluid 22 from the cathode 16 flows through the condenser 20, it is cooled through contact with a second coolant flowing through a second cooling loop, labeled in FIG. 1 as "Loop 2". The second cooling loop is a low-temperature cooling loop, which may be used, for example, to cool a number of vehicle systems such as the power electronics 33 illustrated in FIG. 1. Loop 2 may also cool an electric traction drive motor system or other vehicle components, such that it may operate in a temperature range of −30 C-70 C. The condenser 20 may also include structural features, such as external fins to help reject heat.

The extracted water from the condenser 20 is received by the heat exchanger 24 through one or more water injection nozzles 36. The airflow 26 flowing through the heat exchanger 24 is heated by the heat transferred from the first coolant flowing through the first cooling loop. Because the airflow 26 is heated, it is capable of absorbing a greater quantity of the extracted water received from the condenser 20. This facilitates humidifying the airflow 26 to provide a desired amount of water vapor to the incoming airflow for the cathode 16. Heating the airflow as shown in the embodiment illustrated in FIG. 1 provides an advantage over systems that cool the airflow prior to sending it to a cathode. This is because heating the airflow increases its capacity to carry water vapor, and the additional water vapor in the airflow may be beneficial to the cathode.

In the embodiment illustrated in FIG. 1, the condenser 20 and heat exchanger 24 are at least partially enclosed in a housing 38. Locating at least a portion of the condenser 20 and heat exchanger 24 together in a common housing may have a number of advantages. First, there may be a space savings associated with the compact packaging. In addition, the close proximity between the condenser 20 and heat exchanger 24 means that the connections between them, such as the water line 34, can be relatively short. In a motor vehicle application where the fuel cell and humidification system may be exposed to relatively extreme temperatures, having shorter water lines may lead to fewer problems with freezing. Insulation 40 is disposed between the heat exchanger 24 and the condenser 20. This is because the two components operate at different temperatures, and in fact, the condenser 20 operates more efficiently when it is cool, while the heat exchanger 24 operates more efficiently when it is hot.

Because it is generally desirable to facilitate heat rejection by the condenser 20, the main body of the condenser 20 is not located within the housing 38; rather, only the knockout portion 31 is within the housing 38. This configuration helps to keep the water collected in the lower portion of the knockout 31 from freezing during low-temperature conditions, while still allowing the main body of the condenser 20 to reject heat into its ambient environment. Additional measures to keep the collected water from freezing—or to facilitate melting after it is frozen—are described in more detail below in accordance with FIG. 2.

As illustrated in FIG. 1, the heat exchanger 24 is fluidly connected to the condenser 20 by another water line 42. It may be the case that not all of the extracted water pumped from the condenser 20 into the heat exchanger 24 will be evaporated in the airflow 26. In such case, the unevaporated portion of the extracted water may be collected in a knockout 44 similar to the knockout 31 used in the condenser 20. In some embodiments, the water collected in the knockout 44 may be pumped back to the condenser for reintroduction into the heat exchanger 24 through the water line 34. In the embodiment shown in FIG. 1, the heat exchanger 24 is disposed above the condenser 20, such that the unevaporated portion of the extracted water from the heat exchanger 24 automatically flows into the condenser 20, relying on gravity rather than a pump when the system is off.

When the system is operating, a pressure differential exists between the heat exchanger 24 and the condenser 20—i.e., the pressure in the heat exchanger 24 is higher than the pressure in the condenser 20. This provides enough force to move the unevaporated portion of the extracted water from the heat exchanger 24 to the condenser without relying on gravity. As described in more detail in conjunction with FIG. 4, embodiments of the invention may include a condenser disposed above a heat exchanger. With such a configuration, the pressure gradient may still provide enough force to transfer water upward from the heat exchanger to the condenser. As shown in FIG. 1, the water line 42 is completely within the housing 38, which helps to keep the water in this line from freezing, or to aid in melting, if the humidification system 10 is exposed to low temperatures.

Figure 2:
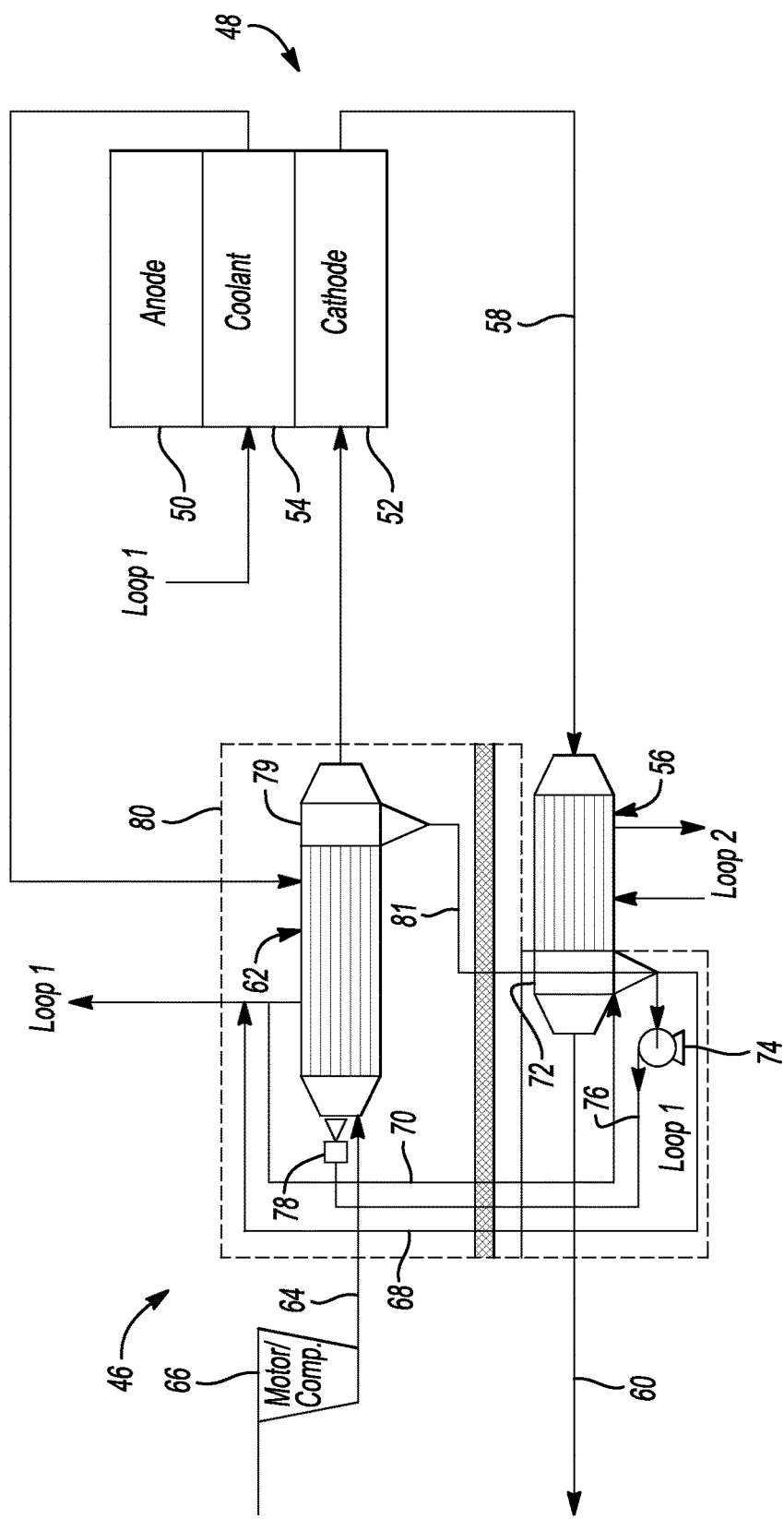
FIG. 2 shows a schematic representation of a humidification system for a fuel cell in accordance with at least some embodiments of the present invention, including a pump integrated into a condenser housing.

FIG. 2 shows a humidification system 46 in accordance with another embodiment of the present invention. Similar to the humidification system 10, the humidification system 46 is configured to work with a fuel cell 48, which includes an anode 50, a cathode 52, and bipolar plates 54 which have a coolant running through them. The bipolar plates 54 receive a first coolant which flows through a first cooling loop labeled as "Loop 1". As in the embodiment illustrated in FIG. 1, it is contemplated that the humidification system 46 and the fuel cell 48 will be used in a vehicle application. Loop 1 shown in FIG. 2 is therefore also a high-temperature loop, which may include the fuel cell 84, and other high-heat producing vehicle systems.

The humidification system 46 includes a condenser 56, which is configured to receive fluid output 58 from the cathode 52 to extract water from it, at least in part by cooling the fluid stream 58. Upon leaving the condenser 56, the non-extracted materials are disposed-of through an exhaust line 60. The humidification system 46 also includes a heat exchanger 62, which transfers heat to an airflow 64 from the first coolant which flows through Loop 1. Similar to the embodiment shown in FIG. 1, the airflow 64 may be compressed by a compressor 66 prior to its entering the heat exchanger 62.

Despite the similarities with the embodiment shown in FIG. 1, the embodiment shown in FIG. 2 includes a number of differences. For example, Loop 1 includes additional coolant lines 68, 70 which flow through the very bottom portion of a knockout 72 in the condenser 56. In some embodiments, the coolant lines 68, 70 may be integrated into a single line, with one flow going through the center of the line, and the other flow going in the opposite direction through an annular space surrounding the inner flow. The knockout 72, similar to the knockout 31 shown in FIG. 1, is the portion of the condenser 56 where the extracted water is collected to be pumped by a pump 74 through a water line 76 through a nozzle or nozzles 78 and into the heat exchanger 62 to contact the airflow 64. In the embodiment shown in FIG. 2, heat from the first coolant flowing through Loop 1 not only facilitates the transfer of heat to the airflow 64 flowing through the heat exchanger 62, but also heats the lower portion of the knockout 72. This helps to keep the extracted water from freezing during low-temperature conditions. To the extent that this water does freeze—e.g., while the vehicle is not operating—coolant lines 68, 70 will quickly become warm enough to melt the water back to its liquid state once the vehicle is running.

As shown in FIG. 2, the water line 76 carrying the extracted water from the condenser 56 to the heat exchanger 62 is disposed proximate a portion of the first cooling loop, and in particular, is located adjacent to both of the coolant lines 68, 70. Depending on the configuration, the water line 76 may be in contact with one or both of the coolant lines 68, 70, or may be located close enough to receive heat from the first coolant through convective or radiative heat transfer. In some embodiments, other methods may be used to provide a heated water line, such as the water line 76, for example, an electric or other heat source may be used. In addition to being located close to coolant lines 68, 70, the water line 76 may further be kept from freezing by being completely enclosed within a housing 80. The housing 80 also encloses the heat exchanger 62 and a portion of the condenser 56—specifically the knockout 72. In this embodiment, the pump 74 is also enclosed within the housing 80, which helps to keep water collected in the pump 74 from freezing as well. Similar to the embodiment shown in FIG. 1, the heat exchanger 62 includes a knockout 79 where an unevaporated portion of the extracted water may collect and be routed back to the condenser 56 through a water line 81.

Figure 3:
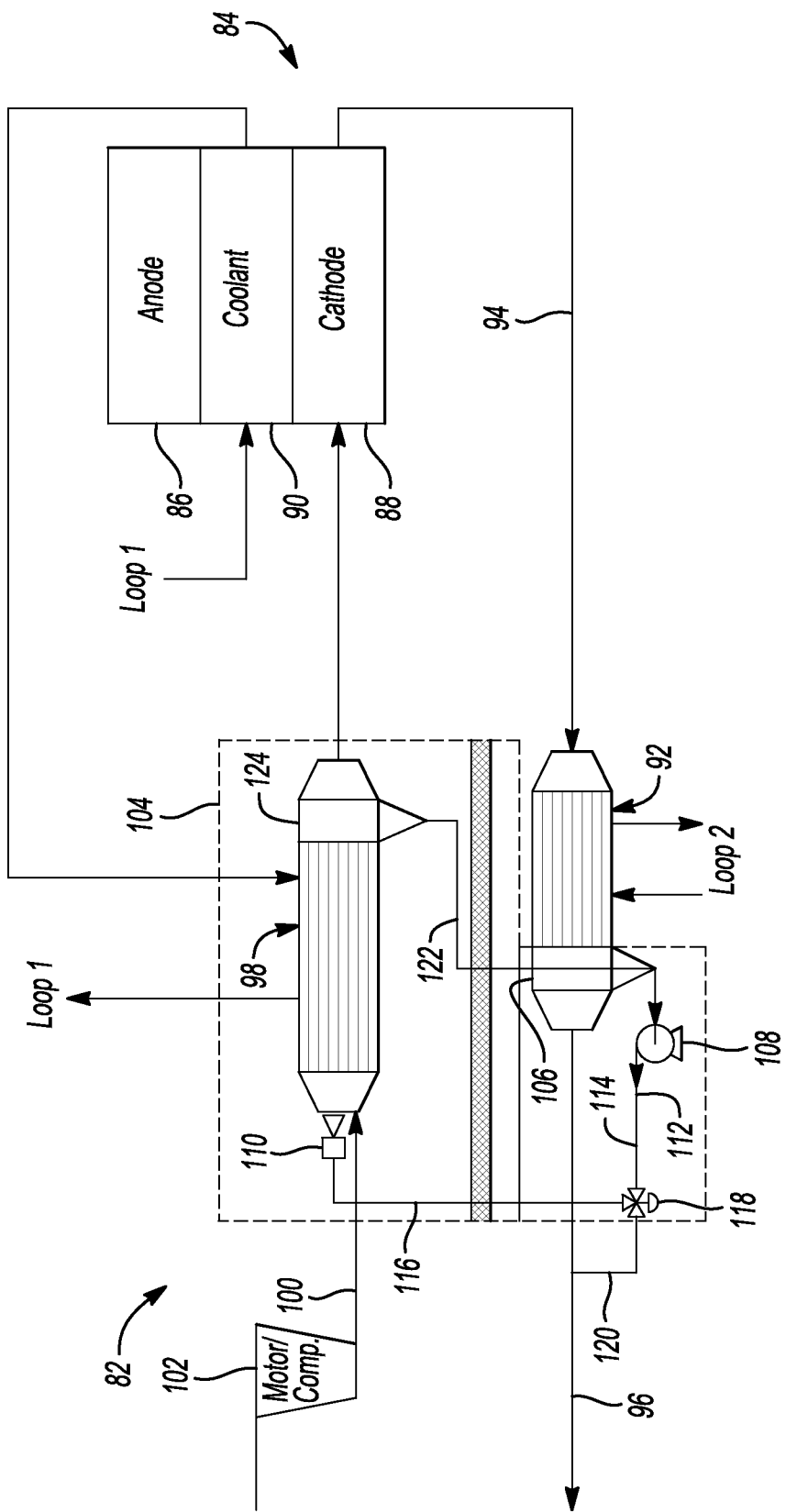
FIG. 3 shows a schematic representation of a humidification system for a fuel cell in accordance with at least some embodiments of the present invention, including a valve for controlling flow of water from a condenser.

FIG. 3 shows a humidification system 82 in accordance with another embodiment of the present invention. Similar to the humidification systems 10 and 46, the humidification system 82 is configured to work with a fuel cell 84, which includes an anode 86, a cathode 88, and bipolar plates 90 which have a coolant running through them. The bipolar plates 90 receive a first coolant which flows through a first cooling loop labeled as "Loop 1". As in the other embodiments described and illustrated herein, it is contemplated that the humidification system 82 and the fuel cell 84 will be used in a vehicle application. Loop 1 shown in FIG. 3 is therefore also a high-temperature loop, which may include the fuel cell 84, and other high-heat producing vehicle systems.

The humidification system 82 includes a condenser 92, which is configured to receive fluid output 94 from the cathode 88 to extract water from it, at least in part by cooling the fluid stream 94. Upon leaving the condenser 92, the non-extracted materials are disposed-of through an exhaust line 96. The humidification system 82 also includes a heat exchanger 98, which transfers heat to an airflow 100 from the first coolant which flows through Loop 1. Similar to the other embodiments, the airflow 100 may be compressed by a compressor 102 prior to its entering the heat exchanger 98. A housing 104 encloses at least a portion of the condenser 92—specifically a knockout 106—and the heat exchanger 98.

The water collected in the lower portion of the knockout 106 is pumped by a pump 108 through a nozzle or nozzles 110 and into the heat exchanger 98. As with the other embodiments, at least a portion of the extracted water pumped into the heat exchanger 98 is evaporated into the airflow 100 before the airflow 100 enters the cathode 88. In the embodiment illustrated in FIG. 3, the outlet 112 of the pump 108 is not connected to the nozzle 110 through a single water line, but rather, it is connected through two water lines 114, 116, which themselves are connected by a 3-way valve 118. The valve 118 is operable to divert at least some of the extracted water from the condenser 92 to the heat exchanger 98, and is further operable to divert at least some of the extracted water from the condenser 92 to a source other than the heat exchanger 98, for example, to the exhaust line 96. The valve 118 is connected to the exhaust line 96 through another water line 120.

The valve 118 provides another mechanism by which the water extracted in the condenser 92 may be kept from freezing. Specifically, if the water collected in the knockout 106 cannot be utilized completely by the heat exchanger 98, the valve 118 can be actuated so that any remaining water in the condenser 92 is pumped into the exhaust stream 96. Then, if the condenser 92, and in particular the knockout 106, is exposed to freezing temperatures, there will be no accumulated water remaining to cause blockage or otherwise interfere with the operation of the humidification system 82. In some embodiments, a trap may be included in the water line 122 running from the heat exchanger 98 to the condenser 92. The trap can "park" the water in the heat exchanger knockout 124, which helps to keep the water in close proximity to Loop 1, which generates heat quickest when the vehicle is restarted.

The valve 118 may be, for example, an electromechanical device, such as a solenoid valve, or it may be completely electronic. In either case, it can be controlled by one or more vehicle control systems, which may be in the form of a dedicated control system such as a fuel cell control unit (FCU) or a larger vehicle-wide controller, such as a vehicle system controller (VSC). The same control system, which may include one or more processors, memory storage units, etc., may also be used to operate various other components, such as the pump 108 the compressor 102, and even operation of the fuel cell 84 itself.

Embodiments of the present invention also include a method for humidifying an airflow for a fuel cell. Using the systems illustrated in FIGS. 1-3, some or all of the following steps may be included as part of such method. For example, an airflow, such as the airflow 26 may be introduced into a heat exchanger, such as the heat exchanger 24—see FIG. 1. Heat may be transferred to the airflow from a fuel cell, such as the fuel cell 12, through the use of a coolant flowing through a cooling loop. A fluid stream, such as the fluid stream 22 may be transferred from the cathode 16 of the fuel cell 12 to condenser 20 where water is extracted from it. At least some of the extracted water may then be transferred from the condenser 20 to the heat exchanger 24 in such a way as to humidify the airflow 26. For example, the extracted water pumped by the pump 32 through the water line 34 may be sprayed into the heat exchanger 24 through the nozzle 36.

Heat may be transferred out of the condenser 20 through a number of heat transfer mechanisms, including through cooling fins or other structural elements of the condenser 20, itself. In conjunction with this form of heat rejection, or alternatively, heat may be transferred from the condenser through a second cooling loop (Loop 2). In such a configuration, the heat may be transferred from the condenser 20 to another radiator, which may be used to cool vehicle electronics via the second coolant flowing through Loop 2. This facilitates the extraction of water from the fluid 22 from the cathode 16.

With a configuration such as illustrated in FIG. 2, heat transferred from a vehicle radiator into a first coolant flowing through a first cooling loop (Loop 1) may not only be transferred to the airflow 64 flowing through the heat exchanger 62, but may also be transferred to a portion of the extracted water before it leaves the condenser 56. Specifically, the coolant lines 68, 70 flow through the lower portion of the knockout 72 of the condenser 56 which facilitates the step of heat transfer from the first coolant to the water residing in the lower portion of the knockout 72. With a configuration such as illustrated in FIG. 3, the method may include diverting at least some of the extracted water from the condenser 92 to a source other than the heat exchanger 98, for example, the exhaust stream 96. As explained above, this may be accomplished by using a valve, such as the 3-way valve 118, and may help to keep accumulated water from freezing in the lower portion of the knockout 106.

Figure 4:
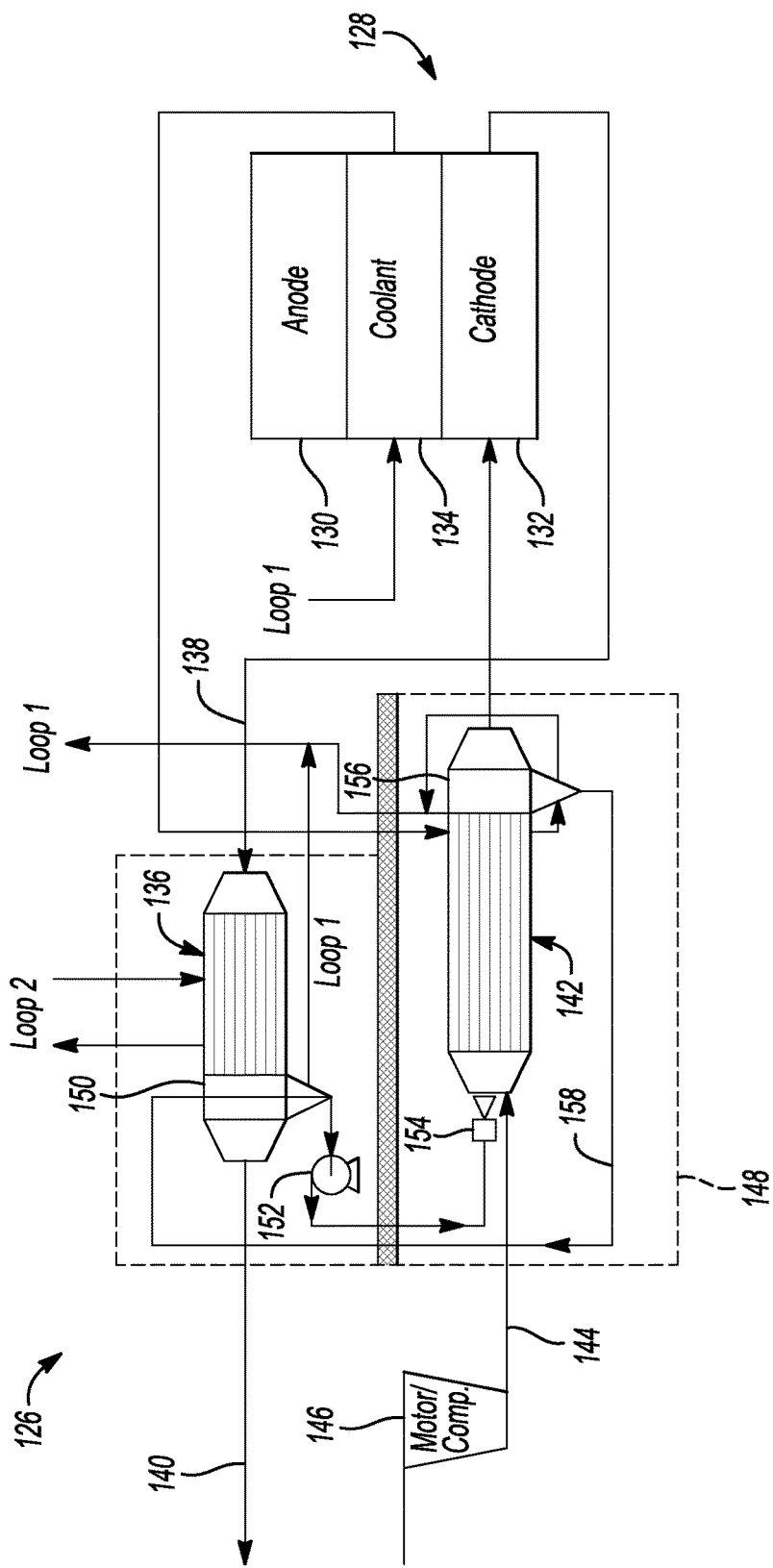
FIG. 4 shows a schematic representation of a humidification system for a fuel cell in accordance with at least some embodiments of the present invention, including a condenser disposed above a heat exchanger.

FIG. 4 shows a humidification system 126 in accordance with another embodiment of the present invention. Similar to the humidification systems 10, 46 and 82, the humidification system 126 is configured to work with a fuel cell 128, which includes an anode 130, a cathode 132, and bipolar plates 134 which have a coolant running through them. The bipolar plates 134 receive a first coolant which flows through a first cooling loop labeled as "Loop 1". As in the other embodiments described and illustrated herein, it is contemplated that the humidification system 126 and the fuel cell 128 will be used in a vehicle application. Loop 1 shown in FIG. 4 is therefore also a high-temperature loop, which may include the fuel cell 128, and other high-heat producing vehicle systems.

The humidification system 126 includes a condenser 136, which is configured to receive fluid output 138 from the cathode 132 to extract water from it, at least in part by cooling the fluid stream 138. Upon leaving the condenser 136, the non-extracted materials are disposed-of through an exhaust line 140. The humidification system 126 also includes a humidifier portion having a heat exchanger 142, which transfers heat between an airflow 144 and the first coolant which flows through Loop 1. Similar to the other embodiments, the airflow 144 may be compressed by a compressor 146 prior to its entering the heat exchanger 142. A housing 148 encloses at least a portion of the condenser 136, including a knockout 150, and the heat exchanger 142.

The water collected in the lower portion of the knockout 150 is pumped by a pump 152 through a nozzle or nozzles 154 and into the heat exchanger 142. As with the other embodiments, at least a portion of the extracted water pumped into the heat exchanger 142 is evaporated into the airflow 144 before it enters the cathode 132. The portion of the extracted water that does not evaporate in the heat exchanger 142 may be collected in a knockout 156 in the heat exchanger. As discussed above, during operation of the system there may be a pressure differential between a heat exchanger and a condenser, such as the heat exchanger 142 and the condenser 136. Specifically, air pressure within the heat exchanger 142 will provide enough force to move the unevaporated portion of the extracted water from the knockout 156 through the water line 158 upwards to the condenser 136.

As shown in FIG. 4, a portion of Loop 1 may be routed through the knockout 150 in the condenser 136 to help keep any accumulated water in the knockout 150 from freezing, or to warm it up quickly if it was exposed to freezing conditions while the system was not operating. The first coolant is routed through the knockout 156 to further help keep any collected water from freezing, or to melt it quickly once the system is restarted. The configuration of the system 126—i.e. having the heat exchanger 142 below the condenser 136—may provide advantages over other configurations, in that the water will tend to collect in the heat exchanger 142, rather than the condenser 136. This helps to keep the collected water from freezing, or alternatively to melt more quickly on startup, because the heat exchanger 142 operates at higher temperatures than the condenser 136.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A humidification system for a fuel cell, comprising:
a condenser configured to receive fluid output from a cathode of the fuel cell and cool the fluid to extract water therefrom; and
a heat exchanger configured to transfer heat between a heat source and an airflow flowing therethrough and bring the airflow in contact with at least some of the extracted water to humidify the airflow prior to the airflow entering the cathode.

2. The humidification system of claim 1, wherein the heat source includes a first coolant flowing through a first cooling loop, and the first coolant is at a higher temperature than the airflow such that heat is transferred from the first coolant to the airflow.

3. The humidification system of claim 2, wherein a portion of the condenser is configured to collect the water as it is extracted from the fluid, and the first cooling loop is routed through the portion of the condenser to transfer heat to the collected water.

4. The humidification system of claim 3, further comprising a heated water line connecting the condenser and the heat exchanger for transferring the extracted water from the condenser to the heat exchanger.

5. The humidification system of claim 4, wherein at least a portion of the water line is disposed proximate the first cooling loop, and is heated by the first coolant.

6. The humidification system of claim 1, further comprising a valve disposed between the condenser and the heat exchanger for controlling flow of the extracted water from the condenser to the heat exchanger, the valve being operable to divert at least some of the extracted water from the condenser to the heat exchanger and being further operable to divert at least some of the extracted water from the condenser to a source other than the heat exchanger.

7. The humidification system of claim 1, further comprising a pump connected to the condenser and the heat exchanger and operable to pump the extracted water from the condenser to the heat exchanger, and wherein the condenser and the heat exchanger are at least partially enclosed in a common housing, the pump being disposed within a portion of the housing enclosing the condenser.

8. The humidification system of claim 1, wherein the heat exchanger is connected to the condenser such that an unevaporated portion of the extracted water in the heat exchanger is routed back to the condenser for reintroduction into the heat exchanger.

9. The humidification system of claim 8, wherein the heat exchanger is disposed above the condenser such that the unevaporated portion of the extracted water in the heat exchanger automatically flows into the condenser.

10. The humidification system of claim 8, wherein the condenser is disposed above the heat exchanger and is positioned such that a pressure gradient between the heat exchanger and the condenser during operation of the heat exchanger causes the unevaporated portion of the extracted water in the heat exchanger to flow into the condenser.

11. A humidification system for a fuel cell, comprising:
a condenser configured to receive fluid output from a cathode of the fuel cell and operable to extract water therefrom; and
a heat exchanger connected to the condenser to receive at least some of the extracted water and configured to transfer heat to an airflow prior to the airflow entering the cathode such that at least some of the extracted water is evaporated into the airflow.

12. The humidification system of claim 11, further comprising:
a housing at least partially enclosing the condenser and the heat exchanger; and
a pump connected to the condenser and the heat exchanger and operable to pump the extracted water from the condenser to the heat exchanger, the pump being disposed within a portion of the housing enclosing the condenser.

13. The humidification system of claim 12, wherein the heat exchanger is fluidly connected to the condenser in the housing such that an unevaporated portion of the extracted water in the heat exchanger flows back into the condenser.

14. The humidification system of claim 11, wherein the heat exchanger is configured to receive heat to transfer to the airflow from a first coolant flowing through a first cooling loop that includes the heat exchanger and a fuel cell stack.

15. The humidification system of claim 14, wherein a portion of the condenser is configured to collect the water as it is extracted from the fluid, and the first cooling loop is routed through the portion of the condenser to transfer heat to the collected water.

16. The humidification system of claim 15, further comprising a water line connecting the condenser and the heat exchanger for transferring the extracted water from the condenser to the heat exchanger, at least a portion of the water line being disposed proximate the first cooling loop to receive heat from the first coolant.

17. The humidification system of claim 14, wherein the condenser is configured to transfer heat to a second coolant flowing through a second cooling loop that includes the condenser and vehicle electronics.

18. A method for humidifying an airflow for a fuel cell, comprising:
introducing an airflow into a heat exchanger and transferring heat to the airflow;
transferring fluid from a cathode of the fuel cell to a condenser and extracting water therefrom;
transferring at least some of the extracted water from the condenser to the heat exchanger and humidifying the heated airflow; and
introducing the humidified airflow into the cathode.

19. The method of claim 18, further comprising diverting at least some of the extracted water from the condenser to a source other than the heat exchanger.

20. The method of claim 18, further comprising transferring an unevaporated portion of the extracted water from the heat exchanger to the condenser.

* * * * *